United States Patent
Dreossi et al.

(10) Patent No.: US 9,857,087 B2
(45) Date of Patent: Jan. 2, 2018

(54) HOUSEHOLD APPLIANCE AND METHOD OF OPERATING A HOUSEHOLD APPLIANCE

(71) Applicant: ELECTROLUX HOME PRODUCTS CORPORATION N.V., Brussels (BE)

(72) Inventors: Guiseppe Dreossi, Stockholm (SE); Bernd Krische, Saltsjö-Boo (SE); Marie Minde, Kista (SE)

(73) Assignee: Electrolux Home Products Corporation N.V., Brussels (BE)

( * ) Notice: Subject to any disclaimer, the term of this patent is extended or adjusted under 35 U.S.C. 154(b) by 0 days.

(21) Appl. No.: 14/651,137

(22) PCT Filed: Dec. 20, 2012

(86) PCT No.: PCT/EP2012/076327
§ 371 (c)(1),
(2) Date: Jun. 10, 2015

(87) PCT Pub. No.: WO2014/094854
PCT Pub. Date: Jun. 26, 2014

(65) Prior Publication Data
US 2015/0308699 A1    Oct. 29, 2015

(51) Int. Cl.
*F24D 17/02* (2006.01)
*A47L 15/42* (2006.01)
(Continued)

(52) U.S. Cl.
CPC .......... *F24D 17/02* (2013.01); *A47L 15/4291* (2013.01); *D06F 33/02* (2013.01);
(Continued)

(58) Field of Classification Search
CPC ...... D06F 58/20; D06F 39/006; D06F 58/206; A47L 15/4291; Y02B 30/52; Y02B 40/54; Y02B 30/123
See application file for complete search history.

(56) References Cited

U.S. PATENT DOCUMENTS 6,151,795 A * 11/2000 Hoffman ................ D06F 58/12
  34/605
9,010,281 B2 * 4/2015 Fushiki ............... F24D 17/0078
  122/19.1
(Continued)

FOREIGN PATENT DOCUMENTS

DE   10 2010 037474    1/2012
EP    2 096 203        9/2009
(Continued)

OTHER PUBLICATIONS

International Preliminary Report on Patentability/Written Opinion for Application No. PCT/EP2012/076327 dated Jun. 23, 2015.
(Continued)

*Primary Examiner* — Gregory A Wilson
(74) *Attorney, Agent, or Firm* — Alston & Bird LLP

(57) ABSTRACT

The invention in particular is directed to a household appliance, such as a washing machine or dishwasher, comprising a heat pump arrangement (3) with a heat pump (4, 5, 6) adapted to transfer heat to an operating medium (2) of the appliance (1, 3), with a closed storage tank (9) adapted to receive a phase change substance (10) and being heat exchangeably coupled with a process side (5) of the heat pump (4, 5, 6), with at least one sensor (11) adapted and arranged to detect an actual phase state of the phase change substance (10), and with a recovery unit (12) adapted and operable to actively recover the phase change substance (10) in dependence of a signal of the sensor (11).

4 Claims, 2 Drawing Sheets

(51) Int. Cl.
  *D06F 39/00*    (2006.01)
  *D06F 33/02*    (2006.01)
  *F25B 30/02*    (2006.01)
  *F25B 49/02*    (2006.01)
  *D06F 39/04*    (2006.01)

(52) U.S. Cl.
  CPC ............ *D06F 39/006* (2013.01); *F25B 30/02* (2013.01); *F25B 49/02* (2013.01); *A47L 2401/34* (2013.01); *A47L 2501/06* (2013.01); *D06F 39/04* (2013.01); *D06F 2202/12* (2013.01); *D06F 2204/04* (2013.01); *D06F 2226/00* (2013.01); *Y02B 30/52* (2013.01); *Y02B 40/54* (2013.01)

(56) References Cited

U.S. PATENT DOCUMENTS

| | | | | |
|---|---|---|---|---|
| 9,238,886 B2 * | 1/2016 | Ryoo | ...................... | D06F 58/02 |
| 2008/0235977 A1 * | 10/2008 | Kuwabara | ............. | D06F 58/206 34/77 |
| 2011/0114134 A1 | 5/2011 | Jerg et al. | | |

FOREIGN PATENT DOCUMENTS

| EP | 2 206 824 | 7/2010 |
|---|---|---|
| EP | 2 465 405 | 6/2012 |

OTHER PUBLICATIONS

International Search Report for PCT/EP2012/076327; dated Sep. 24, 2013.

\* cited by examiner

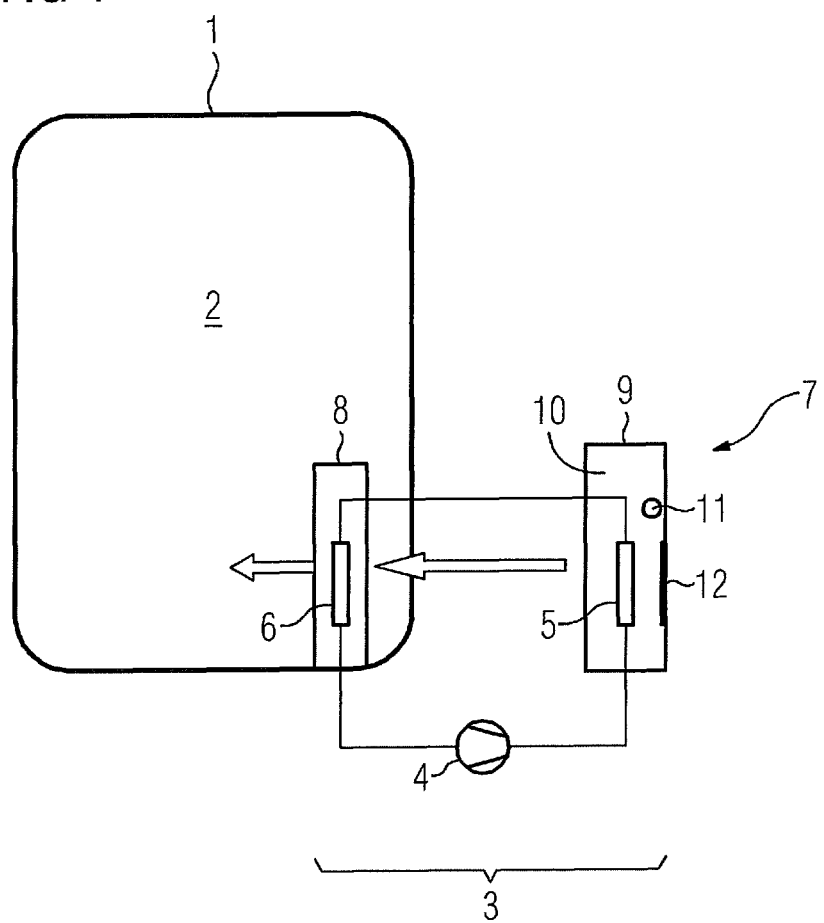

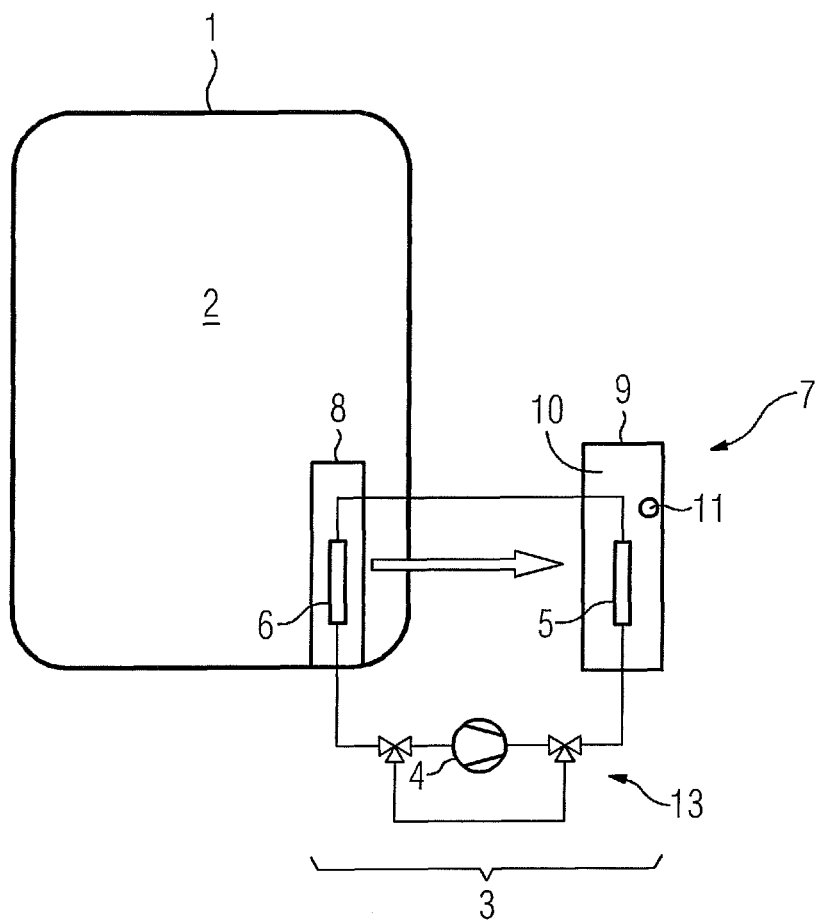

HOUSEHOLD APPLIANCE AND METHOD OF OPERATING A HOUSEHOLD APPLIANCE

CROSS-REFERENCE TO RELATED APPLICATION

This application is a national stage entry of PCT/EP2012/076327 filed Dec. 20, 2012, which application is incorporated by reference herein in its entirety.

FIELD OF THE INVENTION

The present invention is directed to a household appliance and a method of operating a household appliance.

In particular the invention is directed to household appliances comprising a heat pump for more efficiently heating operational liquids, such as washing or cleaning fluids. Respective household appliances are for example washing machines for laundry and dishwashers.

BACKGROUND OF THE INVENTION

A washing machine with a heat pump for heating up washing liquid to be used for washing laundry is known for example from EP 2 206 824 A2. The heat pump cycle of the known washing machine comprises a closed container with a phase change substance acting as a heat reservoir for the evaporator side of the heat pump. Albeit the known washing machine might provide enhanced energy efficiency, there is still room for operational improvements.

SUMMARY OF THE INVENTION

Therefore, it is an object of the invention to provide a household appliance with a heat pump arrangement, having improved operational performance. Further, a method permitting improved operational performance for operating a household appliance having a heat pump arrangement shall be provided.

This object is solved by the independent claims. Embodiments of the invention result from respective dependent claims.

According to claim 1, a household appliance is provided which comprises a heat pump arrangement. The heat pump arrangement comprises a heat pump adapted to transfer heat to an operating medium of the household appliance.

The operating medium in particular may be a washing or cleaning liquid, used for example for washing or cleaning laundry, dishes and similar. Hence, the household appliance of the present invention in particular may be a washing machine for washing laundry or a dishwasher. For heating the operating medium, one or several, in particular conventional, heating elements may be provided, wherein the proposed method is used as an additional or auxiliary heating process.

The heat pump in particular may be used to heat or transfer heat to the operating medium. For this, the condenser side of the heat pump is or may be heat exchangeably coupled to the operating medium, to a tub intended to receive the operational medium or to a heat exchanger arranged within the tub and intended to heat the operational medium.

It shall be noted, that the transfer of heat to the operational medium may be carried out for a restricted period of time in an operational cycle of the household appliance. In particular the heat pump may be activated or active at least partially in at least one operational mode or cycle of the household appliance.

The heat pump arrangement further comprises a closed storage tank which is adapted to receive a phase change substance and which is adapted to be heat exchangeably coupled with or to a process side, in particular an evaporator side, of the heat pump.

The closed storage tank is adapted to receive a preset volume of the phase change substance, wherein the volume of the storage tank may be in the range between 1 l and 20 l, in particular 1 l to 10 l, in particular 1 l to 10 l for receiving water or an eutectic aqueous salt solution of proper freezing point ranging from −10° C. to 15° C. The term "closed" shall in particular mean, that the storage tank tightly encloses the phase change substance, and that the phase change substance is securely enclosed within the storage tank during ordinary operation of the household appliance.

As to the fact that the storage tank is adapted to be heat exchangeably coupled with or to a process side of the heat pump, it shall be mentioned that such a coupling in particular shall enable a heat exchange between the process side, in particular an evaporator, and the phase change substance present in the storage tank. In so far, the storage tank and process side may be mutually arranged and coupled in such a way that a thermal contact and exchange between the process side and phase change substance can be established. In particular, the process side, which may be an evaporator of the heat pump, may be arranged within the inner volume of the storage tank.

As mentioned above, the storage tank is adapted to receive a phase change substance also known as "phase change material" (PCM). A PCM within the present application shall be understood to be a material or substance whose latent heat, which is also known as heat of fusion, at the phase transition point between two phases, in particular between solid and liquid phase, is extractable by the heat pump and can be transferred to the operating medium of the household appliance.

The phase change substance may in particular be a substance or material having a liquid-solid phase transition in the region of ordinary working conditions and temperatures of a household appliance. As a phase change substance, water or an aqueous substance or material may be used. In particular, the phase change substance may be selected to be in the liquid phase under ordinary ambient air temperatures. As PCM, water or an eutectic salt solution of proper freezing point, in particular in the range between −10° C. to 15° C. may be used. However, also solutions that do not have a clear freezing or melting point but solidify over an adequate temperature range could be used as well.

The heat pump arrangement further comprises at least one sensor which is adapted and arranged to detect an actual phase state of the phase change substance. Further, the heat pump arrangement comprises a recovery unit, i.e. a phase change substance recovery unit, which is adapted and operable to actively recover the phase change substance in dependence of a signal of the sensor.

Recovery of the phase change substance in particular shall mean that at least a fraction of the phase change substance is transferred between the two phases. In particular recovery shall mean to transfer at least a fraction of the phase change substance from the solid to the liquid phase. This in particular applies if the phase change substance is used as a heat reservoir, which may be used in dishwashers and washing machines.

Active recovery in particular shall mean that processes and/or devices are activated which are adapted to act on the phase change substance and which are suitable for transferring the phase change substance between the two phases, for example from the solid to the liquid phase. Active recovery for example may comprise heating the phase change substance via a heating element to transfer solid phase substance to the liquid phase.

With the proposed household appliance, the active recovery is carried out or initiated in dependence of a signal of the sensor. This has the advantage that the household appliance can be run in two or more successive operational cycles under identic or almost identic conditions, in particular with respect to transferring heat from the phase change substance to the operating medium.

If sensor based recovery, as proposed by the invention, is not carried out, it may well be that most of the phase change substance is still in the non-recovered state when a subsequent operational cycle is or shall be started. Therefore, active recovery, in particular in early stages, where applicable also in or with a prospective view can improve the operational performance of the household appliance. In embodiments, the appliance or method could be implemented such that it learns the washing pattern or habits of a user, in particular relating to parameters such as frequency, program and the like. In these cases the method or appliance could be able to prospectively determine or calculate if active recovery is likely to be needed and to which extent.

Active recovery of the phase change substance in particular may involve heating the phase change substance in order to transfer at least a fraction thereof from the solid phase to the liquid phase. Preferably, heat for heating the phase chance material is extracted from hot or warm waste liquid, in which cases, preferred power efficiencies can be obtained.

In an embodiment, the storage tank is coupled to an evaporator side of the heat pump such that the phase change substance functions as a heat reservoir for the heat pump. This configuration in particular is appropriate for washing machines and dishwashers, as heat and latent heat of the phase change substance can be transferred via the heat pump to the operating medium, in particular washing liquid, to heat up the operating medium.

In a further embodiment, the at least one sensor is configured to sense at least one parameter indicative of a state of the phase change substance and selected from the group temperature, level, volume, transparency, acoustical dispersion, optical dispersion, conductivity, speed of sound and pressure. The at least one sensor may be one of a temperature sensor, floater, conductivity sensor, optical sensor, pressure sensor and acoustical sensor and the like.

Note that a pressure sensor may for example be provided in a sealed box. The mentioned sensors have proven to be effective in reliably sensing the phase state, in particular fractions or respective solid and liquid phases, of the phase change substance. In total, there may be provided two or more sensors, which may be of identic or different type. Using different sensor types may enhance the precision of determining actual phase states and phase state fractions.

In a further embodiment, it is provided that the heat pump arrangement is adapted to activate the recovery unit in case that a sensor signal indicates a critical phase state. This means that the recovery unit is not required to be constantly operated, but rather can be activated as needed, for example in selected time intervals. This may be advantageous for operational convenience, in particular with respect to noise generation.

The critical phase state in particular may be a state in which at least 85%, preferably at least 90% of the phase change substance has changed or is in the passive, in particular solid, phase. The mentioned critical phase state values have shown to ensure sufficient and satisfactory response times for convenient operation of the household appliance even in successive operational cycles. Here, Energy balance calculations may be performed taking into account program, heat pump run time, water amount, temperature and/or temperature increase during heating in order to determine if the reservoir will be adequate for the complete program, or if recovery has to be triggered at a certain point.

In an embodiment, the recovery unit comprises at least one of a ventilator adapted to impinge the storage tank, and thus indirectly the phase change substance, with ambient air, and a heating element, in particular an electrical resistance heater, for actively heating the phase change substance. Here, in particular with water or aqueous-based phase change substances, adequate recovery times can be obtained, in particular such that the household appliance can be operated in several successive operational cycles. In addition the proposed components may lead to comparatively simple and space-saving constructions. Forced ventilation and heating of the PCM greatly can speed up recovery of the PCM.

According to a further embodiment, the recovery unit may comprise a valve assembly which is adapted and arranged such that the heat pump is operable in reversed mode in order to recover the phase change substance. In particular, the phase change substance can be transferred from the solid phase, which may by a frozen state of the phase change substance, to the liquid phase. By operating the heat pump in reversed mode, heat can be transferred from waste water to the PCM. If, by reverse operation of the heat pump, a sufficient amount of phase change substance is transferred to the recovered phase, in particular liquid phase, the heat pump can be switched to normal operation again.

Note that operation of the ventilator or heating element, or reversal of the heat pump operational mode may be determined or calculated prospectively in such a way, that the household appliance can be operated essentially continuously for a respectively desired or selected number of operational cycles.

As already mentioned, the household appliance may be a washing machine or dishwasher, water heater or chiller. In these cases, the recovered state of the phase change substance is the liquid phase, and heat is transferred by the heat pump from the phase change substance to a washing or cleaning liquid used for washing laundry or cleaning dishes. Transferring heat from the phase change substance in the end will gradually transfer the phase change substance to the solid phase, which in case of water or aqueous-based substances is represented by the frozen state.

It shall be mentioned, that in addition to the active recovery as proposed by the invention, residual heat contained in waste washing or cleaning liquid can be used to at least partially recover the phase change substance. This however is an additional source of recovery and is not dependent on signals of the sensor. In most cases this amount of residual heat of the waste washing or cleaning liquid is not suitable for adequately recovering the phase change substance. Hence, operation of the household appliance under equal operational conditions in several subsequent cycles may be frustrated. As can be seen, active recovery by the recovery unit as proposed herein is beneficial and leads to enhanced operational convenience.

In embodiments it may be provided that the appliance prompts the user to input the desired number of consecutive operating, in particular washing, cycles. In these cases, recovery times or intervals for the PCM can be optimized.

If, for example, the user intends to operate just one cycle, no specific measures may be provided. However, heat exchange surfaces configured to couple the PCM to the outside environment, e.g. via a forced air channel, may be provided. Such heat exchange surfaces may reduce recovery times of the PCM. In recovery processes, condensing water may be generated. In these cases, special collectors or absorbers for the condensing water may be provided.

If the user intends to operate two successive cycles, forced air ventilation or activation of a heater for heating the PCM may be used in the first cycle for securing sufficient amounts of recovered PCM. In the second cycle, forced air circulation and heat pump processes may be used for recovering the PCM.

If the user intends to operate three consecutive cycles, forced air circulation in the first cycle, heating with a conventional heater in the second cycle and recovery in the third cycle can be conducted via heat pump processes. In particular, waste heat from the two or from one former processes can be used to recover the PCM.

As described herein, a method of operating a household appliance is proposed. The household appliance is implemented as described further above and in particular comprises a heat pump arrangement with
- a heat pump adapted to transfer heat to an operating medium of the appliance,
- a closed storage tank adapted to receive a phase change substance and being heat exchangeably coupled with a process side of the heat pump,
- a sensor adapted and arranged to detect an actual phase state of the phase change substance, and
- a recovery unit adapted and operable to actively recover the phase change substance in dependence of a signal of the sensor.

According to the invention, the method comprises the steps of detecting an actual phase state of the phase change substance and operating the recovery unit to recover the phase change substance if a sensor signal is indicative of a predefined critical phase state of the phase change substance.

With the proposed method a nearly continuous operation of the household appliance is possible. In particular, several operational cycles, such as washing or cleaning cycles in washing machines or dishwashers, can be carried out subsequently with almost equal or greatly similar starting conditions, in particular with respect to the initial phase state of the phase change substance. For further advantages, reference is made to the description above and further above.

In an embodiment of the method, the activation of the recovery unit comprises activating a ventilator to impinge the storage tank, thus indirectly the phase change substance, with ambient air. In particular in these operational modes phase change substance can be transferred form the solid phase to the liquid phase and thereby be recovered. After restoring the phase change substance it is available as a heat reservoir for subsequent operational phases.

Using ambient air is just one option. In an embodiment related to a different option, activating the recovery unit comprises activating a heating element to actively apply heat to the phase change substance. Such a heating element in particular may be an electric heater, in particular electric resistance heater, Peltier cell or other.

According to a further variant, activating the recovery unit comprises operating the heat pump in reversed mode to thereby transfer heat energy to the phase change substance.

It shall be noted, that the options for recovering the phase change substance as listed above can be implemented either individually or in any combination. As to further advantages and advantageous effects of the proposed method and related embodiments, reference is also made to the description further above and below.

From the above description it can be seen, that the proposed household appliance and method of operating the same are suitable for improving operational performance as compared to state of the art appliances.

BRIEF DESCRIPTION OF THE SEVERAL VIEWS OF THE DRAWINGS

Embodiments of the invention will now be described in connection with the annexed figures. Note that the exemplary embodiments according to the figures will be described to the extent required for fully understanding the invention. In the figures, FIG. 1 shows a schematic representation of relevant components of a household appliance in a first configuration; and FIG. 2 shows a schematic representation of relevant components of a household appliance in a second configuration.

DETAILED DESCRIPTION

FIG. 1 shows a schematic representation of relevant components of a household appliance in a first configuration. The household appliance in the present case is a dishwasher, but may also be implemented as a washing machine. The appliance comprises a tub 1 adapted to receive or hold dishes to be cleaned. The tub 1 is further adapted to receive an operating medium 2, such as a washing or cleaning liquid.

During washing or cleaning cycles, the operational medium in most of the cases is heated up in order to obtain optimal washing or cleaning results. Heating up the operational medium may be done by using electrical heaters. However, in order to speed up heating and to optimize energy consumption of the household appliance, a heat pump arrangement 3 is provided which is adapted and implemented to transfer heat to the operational medium, and thereby reduce the energy consumption of the heaters.

The heat pump arrangement 3 comprises a heat pump comprising at least a compressor 4, evaporator 5 and condenser 6, as well as interconnecting ducting and other elements (not shown). The heat pump is adapted and implemented to transfer heat from a heat reservoir 7 to the operating medium 2. In FIG. 1, heat transfer is indicated by arrows.

During operation, heat pump circulating fluid takes up, in the evaporator 5, heat from the heat reservoir 7 and releases heat, in the condenser 6. This corresponds to the ordinary operation of a heat pump.

Heat released in the condenser 6 in the present embodiment can or is transferred to the operational medium 2 via a heat exchanger 8. In this way, the operational medium 2 can be heated via action of the heat pump.

The heat pump arrangement 3, in particular the heat reservoir 7, further comprises a storage tank 9 which is filled with a phase change substance 10, in the present case water or an aqueous mixture. As to the term phase change substance 10, reference is made to the description above. In particular it is pointed out, that a phase change substance 10 suitable for the present applications reveals a phase transition liquid-solid, wherein the phase transition is such that latent heat of the phase transition can be exploited or used in the sense of a "heat reservoir".

The storage tank 9 is a closed storage tank, which in particular shall mean that the phase change substance 10 is tightly enclosed in the storage tank 9.

In the present embodiment, the evaporator 5 of the heat pump is arranged within the storage tank 9, such that the evaporator 5, representing a process side of the heat pump, is heat exchangeably coupled to the phase change substance 10.

The heat pump arrangement 3 further comprises a sensor 11 which is adapted to sense or detect an actual phase state of the phase change substance 10.

The heat pump arrangement 3 in the present case further comprises an electric resistance heater 12, which in the present case is arranged within the storage tank 9 in order to directly apply heat energy to the phase change substance 10.

The heat pump arrangement 3 of the present embodiment is adapted and implemented in such a way, that the heater 12 is activated in dependence of a signal of the sensor 11. In more detail, the heater 12 is activated, if the sensor 11 senses or detects a critical phase state of the phase change substance 10.

During ordinary operation of the heat pump as set out above, heat can be transferred from the phase change substance 10 to the operating medium 2 at least as long as phase change substance 10 in the liquid phase exists. In transferring heat to the operating medium 2, the phase change substance 10, which consists of water or an aqueous mixture, is cooled down, and is gradually transferred from the initial liquid phase to the solid or frozen phase.

If all, or essentially all, or at least a major part of the phase change substance 10 is in the solid state, heat transfer from the phase change substance 10 to the operating medium 2 becomes increasingly difficult or less efficient. For this reason, the heat pump arrangement 3 is implemented such that in case that the sensor detects or senses a critical phase state, which may correspond to a situation where all or essentially all of the phase change substance is in the solid phase, the heater 12 is activated to transfer solid phase change substance 10 to liquid phase change substance 10 again.

The action of transferring solid phase change substance 10 to liquid phase change substance 10 is also called "recovery" in the sense of the present invention. It shall be noted that a critical phase state may be any state considered to involve inadequate operational performance and hence requiring recovery of the phase change substance 10. It shall be noted, that the recovery unit, in the present case the heater 12, in general can be activated at any time or in any state, in particular also if no critical phase state is present. There may be provided several threshold values indicative of critical phase stated, wherein the threshold values may be used as activation thresholds for the recovery unit. A respective threshold may be a fixed value set by the manufacturer, a value selected by a user and/or a value calculated or determined, in particular in a prospective manner, by the household appliance, in particular heat pump arrangement 3.

Timely recovering the phase change substance 10 in particular may improve modes of continued operation of the household appliance. In particular, operational modes in which several subsequent washing or cleaning cycles can be conducted under essentially equal conditions may be possible. Actively recovering the phase change substance 10, in the present case via the heater 12, produces a considerable time advantage as compared to passive recovery and/or recovery by transferring residual heat of waste washing or cleaning liquid to the phase change substance 10.

Instead or additional to using the heater 12 as a recovery unit, a ventilator or fan may be used, which is adapted to impinge ambient air to the storage tank 9 and thus to the phase change substance 10.

FIG. 2 shows a schematic representation of relevant components of a household appliance in a second configuration. The second configuration differs from the first configuration in that the recovery unit is implemented in a different way.

In the embodiment as shown in FIG. 2, the heat pump assembly 3, in more detail the recovery unit, comprises a valve assembly 13 which is adapted and arranged such that the heat pump can be operated in reversed mode. In so far, the heat pump in reverse operational mode can be regarded as the recovery unit.

Operating the heat pump in reversed mode will lead to heat transfer to the phase change substance 10. In this way, the phase change substance 10 can be recovered, i.e. solid, frozen phase change substance 10 can be transferred to the liquid phase, i.e. recovered phase. Reversed operation of the heat pump in particular may be applied in a time span between subsequent washing or cleaning cycles. This in particular may be applied if residual waste heat from the tub 1 can be exploited and transferred to the phase change substance 10.

The recovery unit of the second configuration has similar advantages as compared to the heater 12 described in connection with FIG. 1. In particular, it is also possible to obtain continued and uniform operation of the household appliance, in particular in subsequent operational cycles, i.e. washing or cleaning cycles.

REFERENCE SIGNS 1 tub
2 operating medium
3 heat pump arrangement
4 compressor
5 evaporator
6 condenser
7 heat reservoir
8 heat exchanger
9 storage tank
10 phase change substance
11 sensor
12 heater
13 valve assembly

The invention claimed is:

1. Method of operating a household appliance which comprises a heat pump arrangement with a heat pump adapted to transfer heat to an operating medium of the appliance, with a closed storage tank adapted to receive a phase change substance and being heat exchangeably coupled with a process side of the heat pump, with a sensor adapted and arranged to detect an actual phase state of the phase change substance, and with a recovery unit adapted and operable to actively recover the phase change substance in dependence of a signal of the sensor, wherein the method comprises the steps of detecting an actual phase state of the phase change substance and operating the recovery unit for a selected time interval if a sensor signal is indicative of a predefined critical phase state of the phase change substance.

2. Method according to claim 1, wherein activating the recovery unit comprises activating a ventilator to impinge the storage tank, thus indirectly the phase change substance, with ambient air.

3. Method according to claim 1, wherein activating the recovery unit comprises activating a heating element to actively apply heat to the phase change substance.

4. Method according to claim 1, wherein activating the recovery unit comprises operating the heat pump in reversed mode to thereby transfer heat energy to the phase change substance.

* * * * *